United States Patent [19]

Dynie et al.

[11] 4,446,681
[45] May 8, 1984

[54] POWER LAWN RAKE

[75] Inventors: Ernest R. Dynie; Colin Overy, both of Brockville, Canada

[73] Assignee: Black & Decker Inc., Newark, Del.

[21] Appl. No.: 408,483

[22] Filed: Aug. 16, 1982

[51] Int. Cl.³ .......................... A01P 7/02; F01P 1/00
[52] U.S. Cl. .............. 56/16.7; 56/DIG. 18; 56/364; 56/16.6; 123/41.65
[58] Field of Search ............ 56/12.4, 12.5, 16.6, 56/16.7, 364, DIG. 18, 320.2; 123/41.65

[56] References Cited

U.S. PATENT DOCUMENTS

| | | | |
|---|---|---|---|
| 3,044,239 | 7/1962 | Harkness | 123/41.65 |
| 3,054,247 | 9/1962 | Rozsler | 56/16.7 |
| 3,564,823 | 2/1971 | Rhoads | 56/16.7 |
| 3,759,020 | 9/1973 | Simmons | 56/17.5 |
| 3,921,373 | 11/1975 | Rubin | 56/16.7 |
| 3,922,744 | 12/1975 | Doering | 56/16.7 |
| 3,946,543 | 3/1976 | Templeton | 56/17.5 |
| 4,051,648 | 10/1977 | Uhlinger et al. | 56/17.5 |
| 4,344,273 | 8/1982 | Jobling et al. | 56/16.7 |

FOREIGN PATENT DOCUMENTS 1000956 12/1976 Canada .................. 56/DIG. 18

*Primary Examiner*—Gene Mancene
*Assistant Examiner*—John G. Weiss
*Attorney, Agent, or Firm*—Charles E. Yocum; Harold Weinstein; R. B. Sherer

[57] ABSTRACT

An improved power lawn rake has a rotor provided with a plurality of ground-engaging spring tines. The dead leaves and other debris are carried by the rotor along the curved forward wall of a deflector box, and are discharged between the deflector box and a front channel and into a molded bin. The bin is removably mounted on respective side housings of the main frame of the power lawn rake. Ground-engaging forward wheels are vertically adjustable on brackets mounted on the front channel. The wheels are nested within externally-accessible recesses formed in the bin. A driving motor is cantilever mounted on one of the side housings of the frame for driving the rotor. The drive is through gearing (in a gear case secured to the motor housing) and through a belt and pulley arrangement accessible through a cover plate removably secured to the side housing. The motor carries a fan for drawing motor cooling air in through inlet openings in the other side housing and discharging the same around a shroud and through air exhaust openings formed in the one side housing. A first U-shaped handle assembly may be pivoted forwardly of the frame, and a second U-shaped handle assembly may be pivoted over the first handle assembly, thereby facilitating convenient storage of the machine. The second handle assembly has a bight portion forming a hand grip and including a pair of complementary mating halves. A switch and an externally-accessible switch actuator are trapped between the mating halves of the hand grip.

3 Claims, 11 Drawing Figures

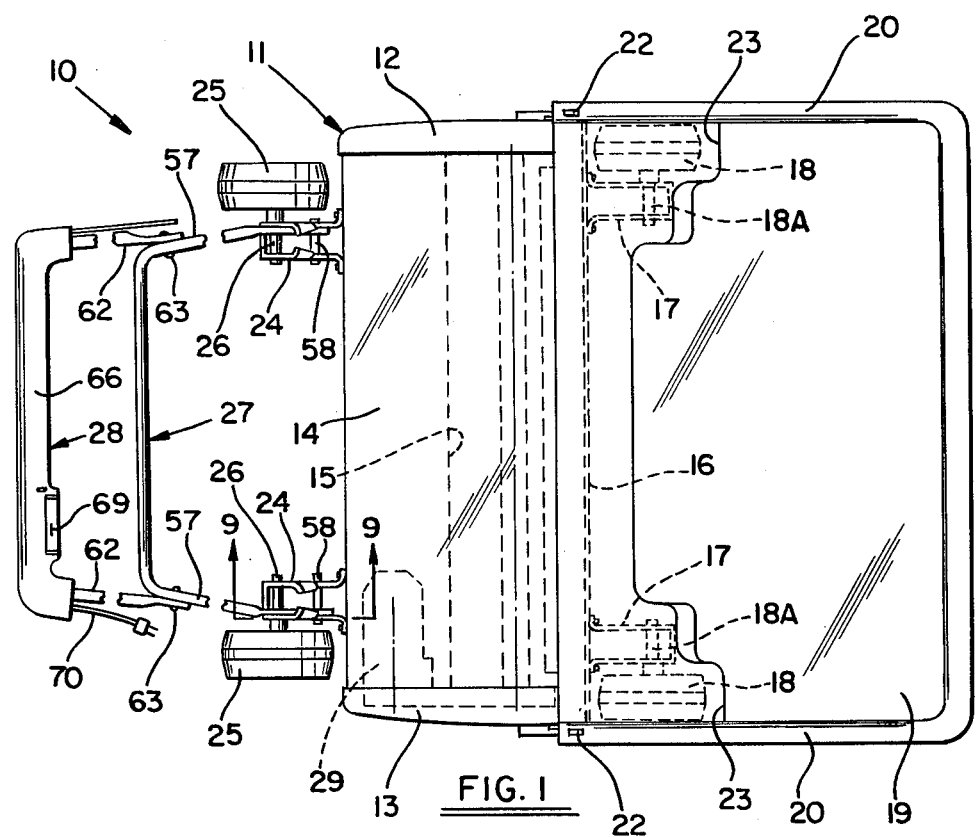
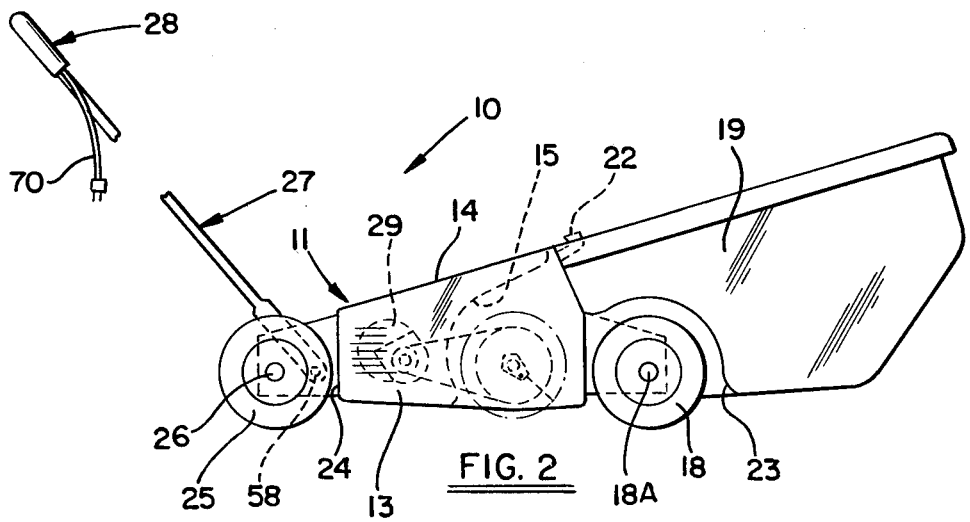

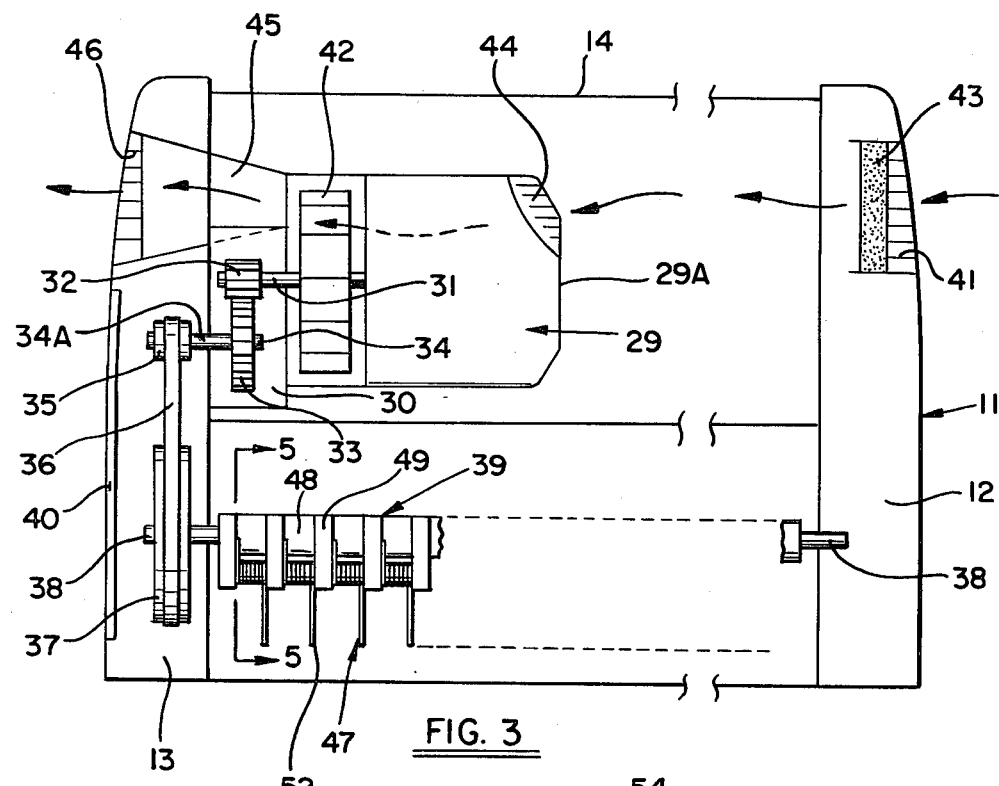
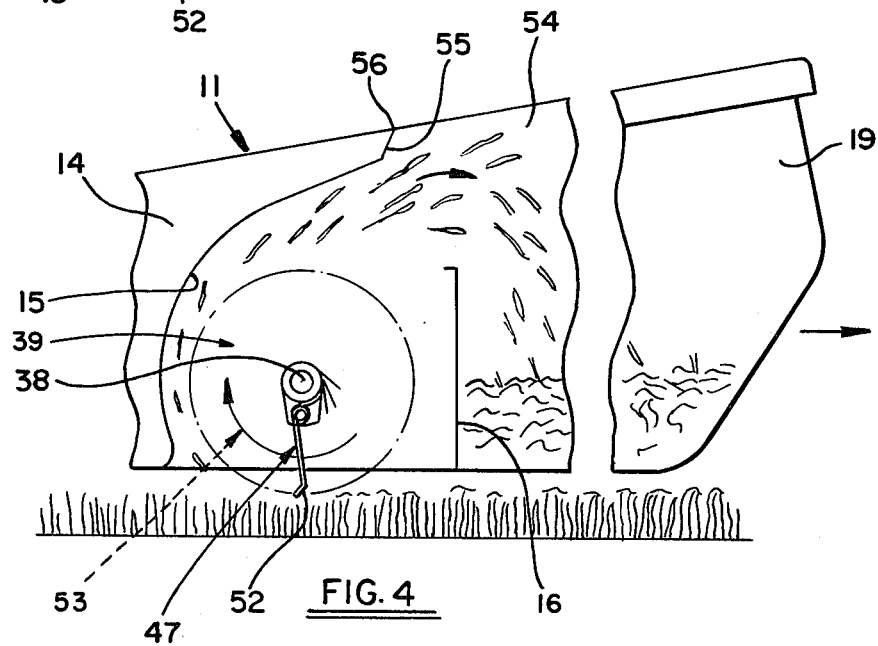

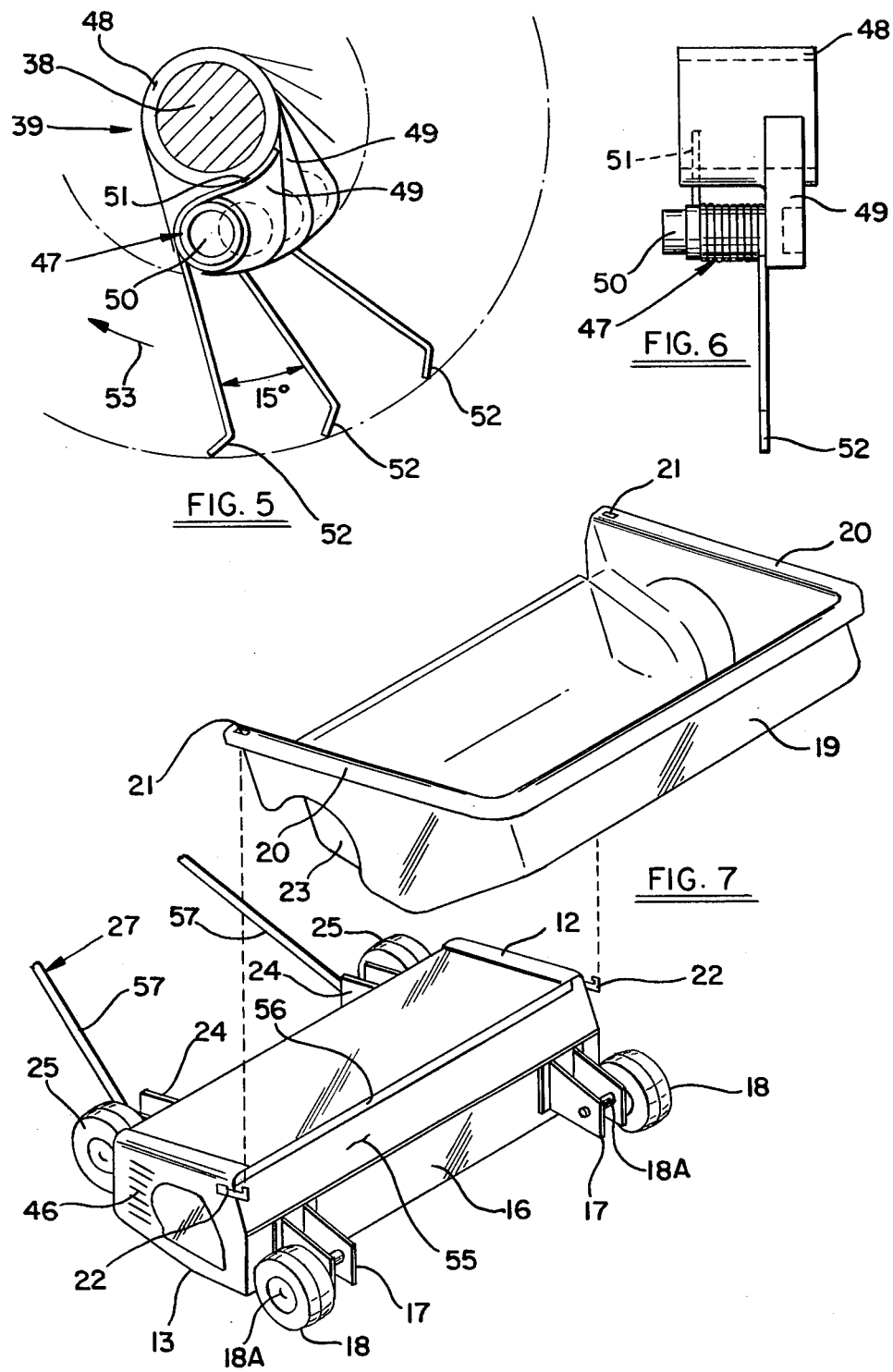

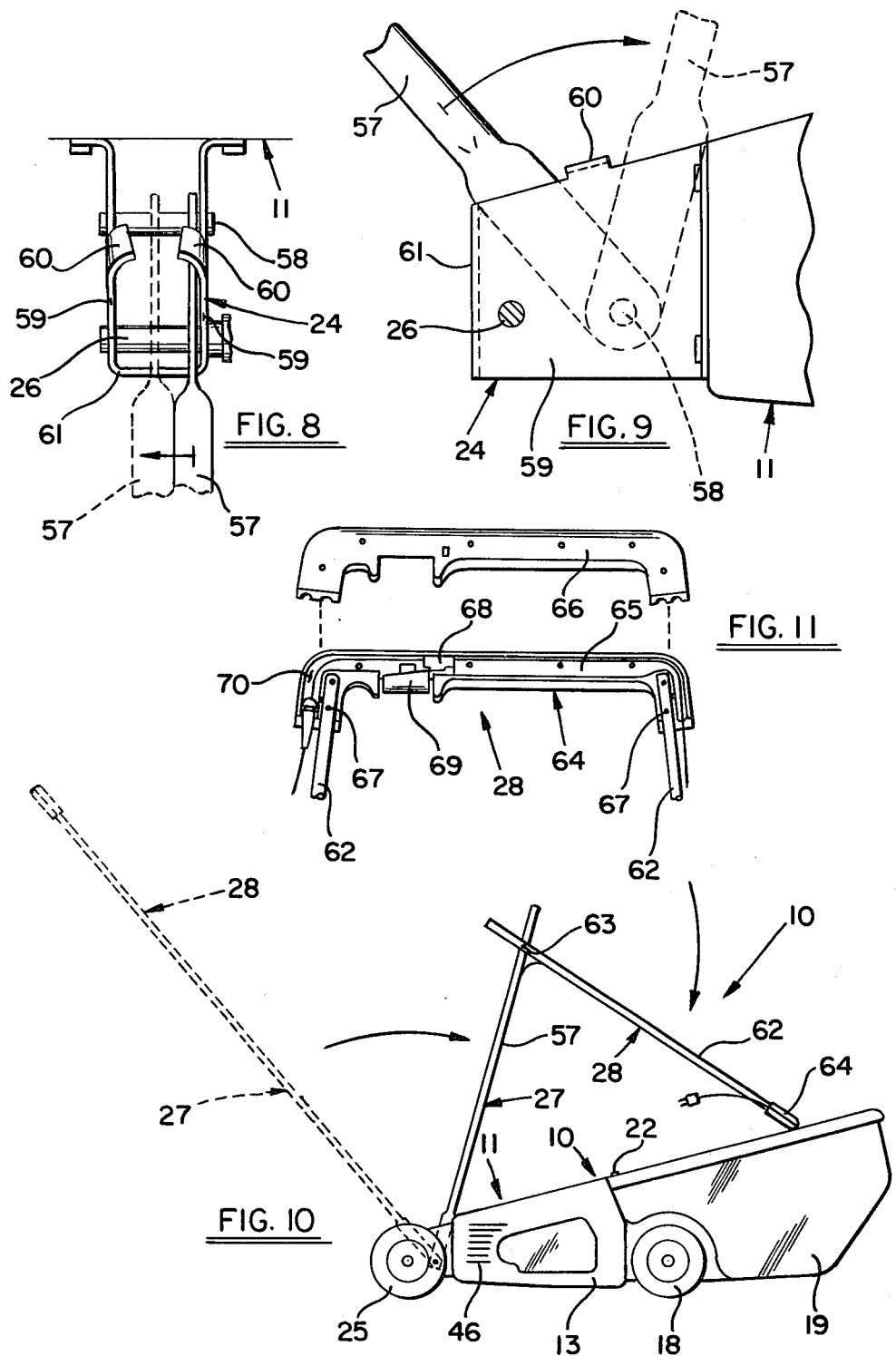

POWER LAWN RAKE

FIELD OF THE INVENTION

The present invention relates to a power lawn rake, and more particularly, to an electric motor-driven lawn rake having an improved design and overall construction, one which facilitates the economical mass-volume manufacture of a superior product.

BACKGROUND OF THE INVENTION

Power-operated lawn rakes, scarifiers and the like have been widely disclosed in the prior art. These machines are generally wheeled appliances that are either self-propelled or pushed by the operator. An electric motor or gasoline engine drives a rotor, usually through suitable gearing, and the rotor carries a plurality of axially-arranged spring fingers or tines which engage the ground. The tines propel the leaves and other debris forwardly of the rotor for collection in a suitable bin, and the bin may be removably mounted on the frame of the machine.

These machines, while perhaps generally satisfactory for the purposes intended, nevertheless have certain inherent disadvantages or deficiencies which detract from their performance, add to their manufacturing cost, or make the machines somewhat awkward and inconvenient to operate. This is especially important for a power lawn rake intended for the consumer market.

SUMMARY OF THE INVENTION

Accordingly, it is an object of the present invention to alleviate the disadvantages and deficiencies of the prior art by providing an improved power lawn rake.

It is another object of the present invention to provide a power lawn rake which is relatively compact and lightweight, convenient to operate, reliable in its performance, and economically producible on a volume basis.

In accordance with the teachings of the present invention, the improved power lawn rake has a main frame which includes a pair of spaced-apart side housings. A rotor is journaled between the respective housings and is provided with a plurality of ground-engaging tines. An electric motor is cantilever mounted on one of the housings and drives the rotor through suitable gearing. A deflector box is mounted between the housings and substantially encloses the motor. A front channel is mounted between the housings and is disposed forwardly of the rotor. The debris is generated by the tines is projected forwardly of the rotor and between the deflector and the front channel. A bin is removably mounted on the respective side housings and is disposed forwardly of the rotor for receiving the debris. Respective wheel brackets are mounted on opposite ends of the channel, and respective ground-engaging forward wheels are adjustably mounted on the brackets. These forward wheels are nested within respective externally-accessible complementary recesses formed in the bin.

In accordance with the further teachings of the present invention, the motor carries a fan for drawing cooling air into an inlet opening formed in one of the side housings. The cooling air passes through a filter and through the deflector, around a shroud or baffle, and exits through an exhaust opening formed in the other side housing.

In accordance with the still further teachings of the present invention, the power lawn rake is provided with first and second U-shaped bifurcated handle assemblies. The first handle assembly may be pivoted forwardly of the main frame, and the second handle assembly may be folded over the first handle assembly, thereby facilitating storage of the machine. The second handle assembly has a bight portion including a pair of insulated complementary mating portions, and a switch and its externally-accessible actuator are trapped between these mating portions.

These and other objects of the present invention will become apparent from a reading of the following specification, taken in conjunction with the enclosed drawings.

BRIEF DESCRIPTION OF THE DRAWINGS

FIG. 1 is a top plan view of an improved power lawn rake incorporating the teachings of the present invention;

FIG. 2 is a side elevation of the power lawn rake shown in FIG. 1;

FIG. 3 is a fragmentary plan layout, partially schematic, showing the cooling means for the motor, and further showing the driving means between the motor and the rotor shaft, the latter carrying the ground-engaging tines;

FIG. 4 is a fragmentary side elevation, partially schematic, and showing the discharge of the debris between the deflector and front channel and into the removable bin;

FIG. 5 is a section view, taken along the lines 5—5 of FIG. 3, drawn to an enlarged scale, and showing the mounting of the tines on the rotor shaft;

FIG. 6 is a fragmentary top plan view of a portion of the rotor, showing one of the coil-spring tines;

FIG. 7 is a partial front perspective of the power lawn rake, showing the front wheels adjustably mounted on the respective brackets carried by the front channel, and further showing the removable bin in exploded relationship to the main frame of the machine;

FIG. 8 is a fragmentary top plan view of the means for pivotably mounting the first handle assembly on the main frame of the power lawn rake, the broken lines showing how the respective leg of the handle may be moved laterally to clear its retaining channel-shaped bracket, thereafter enabling the handle to be pivoted forwardly of the main frame;

FIG. 9 is a side elevation thereof, taken along the lines 9—9 of FIG. 1;

FIG. 10 is a side elevation of the power lawn rake, partially schematic, and showing the second handle assembly folded over the pivoted first handle assembly for convenient storage of the machine; and FIG. 11 is an exploded perspective of the bight portion of the second handle assembly, constituting a hand grip, and showing the manner in which the switch and its switch actuator are trapped between the complementary mating halves of the hand grip.

DESCRIPTION OF THE PREFERRED EMBODIMENT

With reference to FIGS. 1 and 2, and with further reference to FIG. 7, the improved power lawn rake 10 of the present invention has a main frame 11 comprising a first side housing 12, a second side housing 13 spaced therefrom, and a deflector box 14 suitably secured therebetween. The deflector box 14 is provided with a curved forward wall 15. A front channel 16 (shown more clearly in FIG. 7) is secured between the respective side housings forwardly of the deflector box and provides further structural rigidity for the main frame. A pair of front brackets 17 is secured to the respective ends of the front channel, and ground-engaging forward wheels 18 have their respective axles 18A carried by the brackets. A bin (or "bucket") 19, which may be molded from a suitable plastic material if desired, is mounted forwardly of the front channel. The bin 19 has side flanges 20 provided with respective slotted openings 21. These openings 21 are received over respective hooks 22 carried by the side housings (as shown more clearly in FIG. 7) thereby removably mounting the bin on the main frame of the machine. Moreover, the ground-engaging forward wheels are nested within respective complementary recesses 23 formed in the bin. The wheels are thus accessible externally of the bin, and preferably, the wheels are vertically adjustable on their respective brackets.

With further reference to FIGS. 1 and 2, a pair of respective rear brackets 24 are secured to the rear of the deflector box. Ground-engaging rear wheels 25 have their respective axles 26 carried by the rear brackets. A first bifurcated U-shaped handle assembly 27 is mounted on the rear brackets (as hereinafter described), and a second bifurcated U-shaped handle assembly 28 is pivotably mounted to the first handle assembly.

With reference to FIG. 3, an electric motor 29 is housed in a motor housing 29A which is cantilever mounted to the side housing 13 and is disposed within the deflector box 14. The motor housing has an integral gear case 30 which is mounted between the motor housing and the respective side housing. The motor has an armature shaft 31 provided with a pinion 32 engaging a gear 33 on a stub shaft 34. The stub shaft 34 is journaled in the gear case and has a portion 34A extending therefrom and into the side housing 13. The extending portion of the stub shaft carries a first pulley 35 which drives a belt 36 received by a second pulley 37. The second pulley is mounted on the shaft 38 of a rotor 39. The rotor is mounted between the front channel and the curved forward wall of the deflector box (as shown in FIG. 4). A cover plate 40 is removably mounted to the side housing 13 for facilitating easy access to the timing belt. Preferably, the pulleys are formed as sprockets and the belt comprises a timing belt. Moreover, it will be appreciated by those skilled in the art that suitable bearings are provided for respectively journaling the armature shaft, stub shaft, and rotor shaft; however, these bearings have been omitted for ease of illustration.

With further reference to FIG. 3, the side housing 12 has a plurality of inlet openings 41 formed therein. Cooling air for the motor (as indicated by the arrows) is drawn in through these inlet openings 41 by means of a fan 42 carried on the armature shaft. The cooling air passes through a filter 43 mounted adjacent to the air inlet openings, through ventilation slots 44 in the motor housing, past a baffle or shroud 45, and exits through air exhaust openings 46 formed in the other side housing 13.

With reference to FIGS. 4–6, the rotor 39 carries a plurality of eccentrically-mounted coil-spring tines 47. A plurality of sleeves 48 are suitably mounted on the rotor shaft 38 and are axially stacked thereon (as shown in FIG. 3). Preferably, however, the sleeves are circumferentially displaced by fifteen (15) degrees relative to one another (as shown in FIG. 5) for a purpose hereinafter described. Each sleeve has a laterally-extending leg 49 which carries a pin 50, the axis of which is parallel to the axis of the rotor shaft. The coil-spring portion of each tine 47 is mounted on its respective pin 50, eccentrically of the axis of the rotor shaft. One end, 51, of the coil spring bears against its respective sleeve 48, while the other end 52 projects radially therefrom for engaging the ground. As the rotor 38 rotates in the direction of the arrow 53 (in FIGS. 4 and 5), the respective ends 52 of the tines 47 engage the ground and pick up dead leaves, cut grass or other debris on the lawn. However, it will be appreciated that the ends of the tines may deflect upon encountering a large stone or other foreign object on the ground. As previously noted, each sleeve (and hence each tine) is displaced circumferentially by fifteen (15) degrees relative to its adjacent sleeve (or tine); and since there are a total of twenty-four (24) tines in the preferred embodiment, the tines are disposed in a helical arrangement along the rotor shaft.

With further reference to FIG. 4, the dead leaves and other debris (generally denoted at 54) is picked up by the tines on the rotor and is carried by the rotor along the curved forward wall 15 on the deflector box 14. Thereafter, the debris is discharged between a longitudinal "window" 55 (formed between the top edge 56 of the deflector box and the top of the front channel 16) and is received within the removable bin 20.

With reference again to FIGS. 1 and 2, and with further reference to FIGS. 8 and 9, the first U-shaped bifurcated handle assembly 27 has a pair of respective legs 57. Each leg is pivotably mounted on a pin 58 carried by the respective side walls 59 of the channel-shaped rear wheel brackets 24. Each of the side walls has an inwardly-bent tang 60, and each bracket further has a rear wall 61. With this overall structure (and the dimensions thereof) the legs 57 tend to spring apart laterally with repect to each other, thereby retaining the lower portion of each leg between the tang and the rear wall of its respective channel-shaped bracket. However, the legs may be deflected laterally inwardly towards one another so as to clear the tangs 60, as shown by the broken lines in FIG. 8. Thereafter, as shown by the broken lines in FIG. 9, the legs of the first (or lower) handle assembly 27 may be pivoted forwardly to the position shown in FIG. 10. Additionally, the second U-shaped bifurcated handle assembly 28 has a pair of legs 62 pivotably mounted (by wing nuts 63 or other suitable means) to the respective legs 57 on the first handle assembly 27. Thus, as further shown in FIG. 10, the second handle assembly (if desired) may be folded down over the first handle assembly. This arrangement facilitates convenient storage or transportation of the unit.

With reference to FIG. 11, the second handle assembly 28 has a bight portion 64 providing a hand grip for the unit. The bight portion includes a pair of complementary mating halves 65 and 66, which are formed from a suitable insulating material, such as molded plastic. The respective upper portions of the leg 62 have holes mounted on pins 67 integrally formed in the mating half 65. The mating half 66 is suitably secured to the mating half 65 and traps the switch 68 and its switch actuator 69 therebetween. Preferably, the switch actuator 69 is of the "dead man" type, requiring its continuous closure or grip to energize the motor. A line cord has a portion 70 trapped between the mating halves 65, 66 and is suitably connected to the switch.

Thus, it will be appreciated that, in accordance with the teachings of the present invention, an improved power lawn rake has been provided, one which is relatively compact and lightweight, smooth in its operation, reliable in its performance, is aesthetically pleasing, and yet may be manufactured at relatively low cost.

Obviously, many modifications may be made without departing from the basic spirit of the present invention. Accordingly, it will be appreciated by those skilled in the art that within the scope of the appended claims, the invention may be practiced other than has been specifically described herein.

We claim:

1. In a power lawn rake, the combination of a pair of spaced-apart parallel side housings, a rotor journaled respectively in the housings and having a plurality of ground-engaging tines, a deflector box mounted between the side housings and having a curved forward wall disposed rearwardly of the rotor, a motor within the deflector box and being cantilever mounted on one of the housings transverse to said one of the housings, means for driving the rotor from the motor, said means including gearing means within a gear case disposed between the motor and the one side housing, the other side housing having air inlet openings formed therein, a filter carried by the other side housing adjacent to the air inlet openings therein, a fan driven by the motor, the motor having a housing with ventilation slots formed therein opposite said air inlet openings, the one side housing having air exhaust openings formed therein opposite said air inlet openings, and a baffle carried by the one side housing adjacent to the air exhaust openings, the air inlet openings, filter, motor housing ventilation slots, fan, baffle and air exhaust openings defining a substantially horizontal air flow path relative to the ground whereby cooling air for the motor enters the air inlet openings, passes through the ventilation slots in the motor housing and around the baffle, and exits through the air exhaust openings in the one side housing.

2. A power lawn rake, comprising a main frame including a pair of spaced-apart parallel side housings, a rotor journaled respectively in the side housings and having a plurality of ground-engaging tines, a motor being cantilever mounted on one of the side housings, gearing means between the motor and the rotor, a deflector box mounted between the side housings and substantially enclosing the motor, the deflector box having a curved forward wall rearwardly of the rotor, a front channel secured between the side housings forwardly of the rotor, a bin removably mounted on the respective side housings and disposed forwardly of the front channel, whereby the debris is carried by the rotor along the curved wall of the deflector box and is discharged between the top of the deflector box and the front channel and into the bin, ground-engaging wheels rearwardly of the deflector, respective ground-engaging forward wheels mounted on the front channel, the forward wheels being nested within respective externally-accessible complementary recesses formed in the bin, the one side housing having air exhaust openings formed therein, the other side housing having air inlet openings formed therein opposite said air inlet openings, means including a fan driven by the motor for drawing motor cooling air in through the air inlet openings and discharging the same through the air exhaust openings in a substantially horizontal path between the housings with respect to the ground, a first handle assembly including a pair of legs slideably and pivotably mounted on respective pins, the legs tending to spring apart laterally with respect to each other, and being mounted on the main frame, means for pivoting the first handle assembly forwardly of the main frame, said means for pivoting the first handle assembly including a pair of brackets connected to the rear of the main frame and carrying said pins, each bracket having a front and a rear, and further including means on each bracket for confining a lower portion of its respective leg inwardly of the bracket, said means for confining including an inwardly-directed tang formed on the bracket intermediate its front and rear and an inwardly-directed wall formed on the bracket adjacent its rear, the legs normally being retained between the tang and the bracket wall, whereby the legs may be deflected laterally inwardly along their respective pins to clear the bracket tangs so that the first handle assembly can be pivoted forwardly of the main frame, a second handle assembly pivotably connected to the first handle assembly, whereby the second handle assembly may be folded over the first handle assembly, the second handle assembly having a bight portion forming a hand grip and including a pair of insulated complementary mating portions, a switch having an actuator, and means for trapping the switch and switch actuator between the mating portions of the hand grip.

3. The power lawn rake claimed in claim 2, wherein each of the rear brackets being defined by a U-shaped channel having a pair of arms joined by a base, each pin being carried by both arms, a tang being formed on the upper edge of each arm, the tangs being bent to face each other and defining an opening for passage of a respective leg from its rearward position to its forward position, and vise-versa, and the bracket rear wall being defined by said channel base.

* * * * *